(12) United States Patent
Banno

(10) Patent No.: US 10,710,934 B2
(45) Date of Patent: Jul. 14, 2020

(54) DIELECTRIC CERAMIC COMPOSITION AND CERAMIC CAPACITOR

(71) Applicant: Murata Manufacturing Co., Ltd., Nagaokakyo-shi, Kyoto-fu (JP)

(72) Inventor: Koichi Banno, Nagaokakyo (JP)

(73) Assignee: MURATA MANUFACTURING CO., LTD., Nagaokakyo-shi, Kyoto-fu (JP)

( * ) Notice: Subject to any disclaimer, the term of this patent is extended or adjusted under 35 U.S.C. 154(b) by 0 days.

(21) Appl. No.: 16/359,226

(22) Filed: Mar. 20, 2019

(65) Prior Publication Data

US 2019/0218146 A1    Jul. 18, 2019

Related U.S. Application Data

(63) Continuation of application No. PCT/JP2017/034486, filed on Sep. 25, 2017.

(30) Foreign Application Priority Data

Sep. 29, 2016  (JP) ................. 2016-190944

(51) Int. Cl.
*C04B 35/495* (2006.01)
*H01G 4/12* (2006.01)
(Continued)

(52) U.S. Cl.
CPC ...... *C04B 35/495* (2013.01); *C04B 35/62685* (2013.01); *H01G 4/012* (2013.01); *H01G 4/12* (2013.01); *H01G 4/1254* (2013.01); *H01G 4/248* (2013.01); *H01G 4/30* (2013.01); *C04B 2235/3201* (2013.01); *C04B 2235/3203* (2013.01); *C04B 2235/3208* (2013.01);
(Continued)

(58) Field of Classification Search
CPC ... C04B 35/495; H01G 4/1254; H01G 4/1263
See application file for complete search history.

(56) References Cited

U.S. PATENT DOCUMENTS 7,691,286 B2 *   4/2010   Kawada ............... C04B 35/495
                                                              252/62.9 R
7,742,278 B2 *   6/2010   Takeda ................ C04B 35/4682
                                                              361/301.4

(Continued)

FOREIGN PATENT DOCUMENTS

JP    2007055867 A    3/2007
JP    2011037697 A    2/2011
(Continued)

OTHER PUBLICATIONS

International Search Report issued for PCT/JP2017/034486, dated Dec. 12, 2017.

*Primary Examiner* — Karl E Group
(74) *Attorney, Agent, or Firm* — Arent Fox LLP

(57) ABSTRACT

A dielectric ceramic composition represented by a general formula $\{(Na_{1-v-w-x}K_vLi_wM2_x)(Nb_{1-y-z}Ta_yM4_z)O_3+\alpha MnO+\beta La_2O_3+\gamma Li_2O\}$, wherein $0 \leq v \leq 0.01$, $0 \leq w \leq 0.01$, $0.05 \leq x$, $z \leq 0.15$, $0 \leq y \leq 0.1$, $0.003 \leq \alpha \leq 0.05$, $0.001 \leq \beta \leq 0.05$, and $0.005 \leq \gamma \leq 0.05$. M2 is Ba, Ca, and/or Sr, and M4 is Zr, Hf, and/or Sn. A ceramic layer is formed of the dielectric ceramic composition, and an internal electrode is formed of a base metal material such as Ni.

16 Claims, 1 Drawing Sheet

(51) Int. Cl.
- *H01G 4/30* (2006.01)
- *H01G 4/248* (2006.01)
- *H01G 4/012* (2006.01)
- *C04B 35/626* (2006.01)

(52) U.S. Cl.
CPC .......... *C04B 2235/3213* (2013.01); *C04B 2235/3215* (2013.01); *C04B 2235/3227* (2013.01); *C04B 2235/3244* (2013.01); *C04B 2235/3251* (2013.01); *C04B 2235/3255* (2013.01); *C04B 2235/3262* (2013.01); *C04B 2235/3293* (2013.01); *C04B 2235/604* (2013.01); *C04B 2235/652* (2013.01); *C04B 2235/768* (2013.01); *C04B 2235/95* (2013.01)

(56) References Cited

U.S. PATENT DOCUMENTS

| | | |
|---|---|---|
| 2011/0012051 A1 | 1/2011 | Kaigawa et al. |
| 2014/0055009 A1 | 2/2014 | Hatano et al. |
| 2016/0005541 A1 | 1/2016 | Banno et al. |
| 2016/0351789 A1 | 12/2016 | Watanabe et al. |

FOREIGN PATENT DOCUMENTS

| | | |
|---|---|---|
| JP | 2014043358 A | 3/2014 |
| JP | 2015163576 A | 9/2015 |
| WO | 2014162752 A1 | 10/2014 |

\* cited by examiner

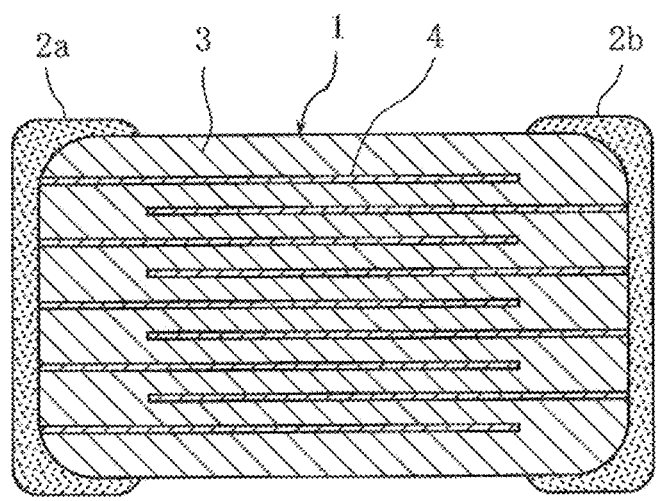

DIELECTRIC CERAMIC COMPOSITION AND CERAMIC CAPACITOR

CROSS REFERENCE TO RELATED APPLICATIONS

The present application is a continuation of International application No. PCT/JP2017/034486, filed Sep. 25, 2017, which claims priority to Japanese Patent Application No. 2016-190944, filed Sep. 29, 2016, the entire contents of each of which are incorporated herein by reference.

FIELD OF THE INVENTION

The present invention relates to dielectric ceramic compositions and ceramic capacitors, and more particularly, to a dielectric ceramic composition mainly containing alkali metal niobate-based ceramic material and a ceramic capacitor such as a multilayer ceramic capacitor including the dielectric ceramic composition.

BACKGROUND OF THE INVENTION

In recent years, multilayer ceramic capacitors have been mounted in various electric devices. Various dielectric materials used for multilayer ceramic capacitors of this type have also been studied and developed actively, and of these dielectric materials, a dielectric ceramic composition containing an alkali metal niobate-based perovskite compound has also been proposed.

For example, PTL 1 proposes a dielectric ceramic composition containing a main compound represented by $(K_aNa_bLi_cM2_d)(Nb_wTa_xMg_yM4_z)O_3$, wherein M2 is at least one of Ca, Sr, and Ba, and M4 is at least one of Zr, Hf, and Sn, satisfying relationships of $w+x+y+z=1$, $0.07 \le a \le 0.92$, $0 \le b \le 0.81$, $0 \le c \le 0.09$, $0.57 \le a+b+c \le 0.95$, $0.1 \le d \le 0.4$, $0.95 \le a+b+c+d \le 1.05$, $0.73 \le w+x \le 0.93$, $0 \le x/(w+x) \le 0.3$, $0.02 \le y \le 0.07$, and $0.05 \le z \le 0.2$, and containing 2 to 15 parts by mol of Mn relative to 100 parts by mol of a total content of Nb, Ta, Mg, and M4.

According to PTL 1, a dielectric ceramic composition having the above composition is used to obtain a multilayer ceramic capacitor whose insulation resistance hardly decreases even when firing is performed in a reducing atmosphere and which has a small capacitance-temperature change rate in a wide temperature range, and accordingly has good insulating properties and good dielectric characteristics even when an inexpensive base metal such as Ni is used for internal electrodes.

PTL 1: WO 2014/162752 (claims 1, 2, paragraph [0011])

SUMMARY OF THE INVENTION

According to PTL 1, the dielectric ceramic composition has good insulating properties in a reducing atmosphere and has good dielectric characteristics, such as relative dielectric constant εr and dielectric loss tan δ, at no load, but suffers from poor DC bias characteristics. For example, the relative dielectric constant εr of the dielectric ceramic composition decreases greatly when dc electric field is applied.

The present invention has been made in view of the circumstances described above, and has an object to provide a dielectric ceramic composition which has good dielectric characteristics without loss of insulating properties even when firing is performed in a reducing atmosphere, has reduced fluctuations in dielectric characteristics even when dc electric field is applied, and has good DC bias characteristics. The present invention has another object to provide a ceramic capacitor such as a multilayer ceramic capacitor including the dielectric ceramic composition.

To achieve the above objects, the present inventors have conducted a diligent study using a dielectric ceramic material having a perovskite crystal structure (general formula $ABO_3$) mainly containing $NaNbO_3$—$CaZrO_3$ as described in PTL 1, and obtained the following findings. By preparing a main ingredient at a predetermined blending ratio and adding predetermined amounts of Mn, La, and Li as sub-ingredients, a dielectric ceramic composition can be obtained that maintains good insulating properties and good dielectric characteristics even when firing is performed in a reducing atmosphere, has reduced fluctuations in dielectric characteristics even when dc electric field is applied, and has good DC bias characteristics.

The present inventors have also found that approximately similar effects can be achieved also by partially replacing Ca of $CaZrO_3$ by Ba and/or Sr or by partially replacing Zr by Hf and/or Sn.

Further, the present inventors have found that approximately similar effects can be achieved even by adding K and/or Li to an A site while partially replacing Na by K and/or Li in a predetermined range or adding Ta to a B site while partially replacing Nb by Ta in a predetermined range.

The present invention has been made based on such findings. A dielectric ceramic composition according to the present invention contains a main ingredient formed of a perovskite compound represented by a general formula $ABO_3$. The dielectric ceramic composition has an A site that contains at least an alkali metal element containing Na and an M2 element, where M2 represents at least one kind of element selected from the group consisting of Ba, Ca, and Sr, and a B site that contains at least Nb and an M4 element, where M4 represents at least one kind of element selected from the group consisting of Zr, Hf, and Sn. A molar ratio content of the M2 element is 0.05 to 0.15 relative to a total of constituent elements of the A site, and a molar ratio content of the M4 element is 0.05 to 0.15 relative to a total of constituent elements of the B site. The dielectric ceramic composition also contains Mn, La, and Li as sub-ingredients. A content of the Mn is 0.003 to 0.05 parts by mol relative to 1 part by mol of the total of the constituent elements of the B site in terms of MnO, a content of the La is 0.001 to 0.05 parts by mol relative to 1 part by mol of the total of the constituent elements of the B site in terms of $La_2O_3$, and a content of the Li is 0.005 to 0.05 parts by mol relative to 1 part by mol of the total of the constituent elements of the B site in terms of $Li_2O$. At least one of K and Li can be added to the A site in a molar ratio range of 0 to 0.01 relative to the total of the constituent elements of the A site, and Ta can be added to the B site in a molar ratio range of 0 to 0.1 relative to the total of the constituent elements of the B site.

A ceramic capacitor according to the present invention is a ceramic capacitor including a ceramic body and an external electrode formed on a surface of the ceramic body, which is characterized in that the ceramic body is formed of the dielectric ceramic composition.

Further, the ceramic capacitor of the present invention further includes an internal electrode containing a base metal material which is preferably buried in the ceramic body, and in this case, the base metal material preferably contains Ni.

The dielectric ceramic composition of the present invention has the above ingredient composition. Accordingly, a dielectric ceramic composition can be obtained that has good insulating properties, a desired high relative dielectric constant, and a low dielectric loss, has reduced fluctuations in relative dielectric constant εr and dielectric loss tan δ even when dc electric field is applied, and has good DC bias characteristics.

The ceramic capacitor of the present invention is a ceramic capacitor including an external electrode formed on the surface of a ceramic body, and the ceramic body is formed of the dielectric ceramic composition descried any of the above. Accordingly, a high-quality ceramic capacitor can be obtained at low cost that has good insulating properties and good dielectric characteristics even when an inexpensive base metal material such as Ni and the dielectric ceramic composition are co-fired in a reducing atmosphere, and has good DC bias characteristics.

BRIEF DESCRIPTION OF THE DRAWING

The FIGURE is a sectional view showing one embodiment of a multilayer ceramic capacitor as a ceramic capacitor including a dielectric ceramic composition according to the present invention.

DETAILED DESCRIPTION OF THE PREFERRED EMBODIMENTS

An embodiment of the present invention will now be described in detail.

A dielectric ceramic composition according to one embodiment of the present invention includes a main ingredient formed of a perovskite compound represented by a general formula $ABO_3$. The A site contains at least an alkali metal element containing Na and an M2 element, and the B site contains at least Nb and an M4 element.

Herein, the M2 element is at least one kind of element having a valence of 2 selected from the group consisting of Ba, Ca, and Sr, and the M4 element is at least one kind of element having a valence of 4 selected from the group consisting of Zr, Hf, and Sn.

A molar ratio content x of the M2 element is 0.05 to 0.15 relative to the total of constituent elements of the A site.

A molar ratio content z of the M4 element is 0.05 to 0.15 relative to the total of constituent elements of the B site.

The dielectric ceramic composition also contains predetermined amounts of Mn, La, and Li as sub-ingredients, in addition to the main ingredient.

Specifically, a content of each sub-ingredient is defined such that a content α of Mn is 0.003 to 0.05 parts by mol relative to 1 part by mol of the total of the constituent elements of the B site in terms of MnO, a content β of La is 0.001 to 0.05 parts by mol relative to 1 part by mol of the total of the constituent elements of the B site in terms of $La_2O_3$, and a content γ of Li is 0.005 to 0.05 parts by mol relative to 1 part by mol of the total of the constituent elements of the B site in terms of $Li_2O$.

Consequently, a dielectric ceramic composition can be obtained that has good insulating properties and good dielectric characteristics even when firing is performed in a reducing atmosphere, has a less decrease in relative dielectric constant εr and a less increase in dielectric loss even when dc electric field is applied and accordingly has reduced fluctuations in dielectric characteristics, and has good DC bias characteristics.

Specifically, a dielectric ceramic composition can be obtained that has good insulating properties with a specific resistance of $1.0 \times 10^{10}$ Ω·m and has good dielectric characteristics with a relative dielectric constant εr of 1000 or more and a dielectric loss tan δ of 6% or less even when firing is performed in a reducing atmosphere, has good DC bias characteristics with a relative dielectric constant εr of 800 or more and a dielectric loss tan δ of 6% or less even when applied with a dc electric field of 10 kV/mm, and has good DC bias characteristics.

The dielectric ceramic composition can contain at least one kind of K and Li in the A site if necessary such that the Na is partially replaced by the at least one kind of K and Li in a molar ratio range of 0.01 or less relative to the total of the constituent elements of the A site.

Further, the dielectric ceramic composition can contain Ta in the B site if necessary such that the Nb is partially replaced by Ta in a molar ratio range of 0.1 or less relative to the total of the constituent elements of the B site.

That is to say, in the present invention, the main ingredient can be represented by a general formula (A), and the dielectric ceramic composition can be represented by a general formula (B) below.

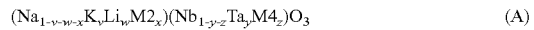

$(Na_{1-v-w-x}K_vLi_wM2_x)(Nb_{1-y-z}Ta_yM4_z)O_3$      (A)

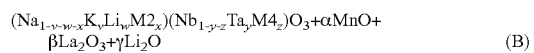

$(Na_{1-v-w-x}K_vLi_wM2_x)(Nb_{1-y-z}Ta_yM4_z)O_3 + \alpha MnO + \beta La_2O_3 + \gamma Li_2O$      (B)

where v, w, x, y, z, α, β, and γ satisfy mathematical expressions (1) to (8).

$0 \leq v \leq 0.01$      (1)

$0 \leq w \leq 0.01$      (2)

$0.05 \leq x \leq 0.15$      (3)

$0 \leq y \leq 0.1$      (4)

$0.05 \leq z \leq 0.15$      (5)

$0.003 \leq \alpha \leq 0.05$      (6)

$0.001 \leq \beta \leq 0.05$      (7)

$0.005 \leq \gamma \leq 0.05$      (8)

The reason why x, z, v, w, y, α, β, and γ are defined in the above range will now be described.

(1) x, z

A dielectric ceramic composition having good insulating properties and good dielectric characteristics and also having good DC bias characteristics can be obtained by dissolving a $M2M4O_3$-based compound in a solid state into an alkali metal niobate-based compound, replacing the A site by the M2 element, and replacing the B element by the M4 element, coupled with the effect obtained by adding a predetermined amount of sub-ingredient.

For that purpose, it is important to regulate the contents of the M2 element of the A site and the M4 element of the B site in appropriate ranges.

That is to say, a molar ratio content x of the M2 element which falls below 0.05 relative to the total of the constituent elements of the A site excessively increases the content ratio of the alkali niobate-based compound of the main ingredient. Consequently, good dielectric characteristics cannot be achieved, and also, poor insulating properties are obtained.

Contrastingly, a molar ratio content x of the M2 element which exceeds 0.15 relative to the total of the constituent elements of the A site in is not preferable because the content ratio of the $M2M4O_3$-based compound of the main ingredient may increase to reduce insulating properties and dielectric characteristics.

Similarly, a molar ratio content z of the M4 element which falls below 0.05 relative to the total of the constituent elements of the B site excessively increases the content ratio of the alkali niobate-based compound of the main ingredient. Consequently, good dielectric characteristics cannot be obtained, and also, poor insulating properties are obtained.

Contrastingly, a molar ratio content z of the M4 element which exceeds 0.15 relative to the total of the constituent elements of the B site is not preferable because the content ratio of the $M2M4O_3$-based compound of the main ingredient may increase to reduce insulating properties and dielectric characteristics.

In the present embodiment, thus, preparation is made such that a molar ratio content x of the M2 element is 0.05 to 0.15 relative to the total of the constituent elements of the A site and that a molar ratio content z of the M4 element is 0.05 to 0.15 relative to the total of the constituent elements of the B site.

(2) v

Preferably, Na of the A site is partially replaced by K if necessary.

Even when Na is partially replaced by K, however, a molar ratio content v of K of the A site which exceeds 0.01 is not preferable because insulating properties may decrease when firing is performed in a reducing atmosphere.

In the present embodiment, thus, a molar ratio content v of K of the A site is set to be less than or equal to 0.01 relative to the total of the constituent elements of the A site even when Na is partially replaced by K.

(3) w

Preferably, Na of the A site is partially replaced by Li if necessary.

Even when Na is partially replaced by Li, however, a molar ratio content w of Li of the A site which exceeds 0.01 is not preferable because relative dielectric constant εr may decrease.

In the present embodiment, thus, even when Na is partially replaced by Li, a molar ratio content w of Li of the A site is set to be less than or equal to 0.01 relative to the total of the constituent elements of the A site.

(4) y

Preferably, Nb of the B site is partially replaced by Ta if necessary.

Even when Nb is partially replaced by Ta, however, a molar ratio content y of Ta of the B site which exceeds 0.1 is not preferable because relative dielectric constant εr may decrease.

In the present embodiment, thus, even when Nb is partially replaced by Ta, a molar ratio content y of Ta of the B site is set to be less than or equal to 0.1 relative to the total of the constituent elements of the B site.

(5) α

Mn is added to the dielectric ceramic composition as a sub-ingredient to improve insulating properties, leading to improved DC bias characteristics.

For that purpose, a content α of Mn needs to be at least 0.003 parts by mol relative to 1 part by mol of the total of the constituent elements of the B site in terms of MnO.

However, a content α of Mn which exceeds 0.05 parts by mol relative to 1 part by mol of the total of the constituent elements of the B site in terms of MnO is not preferable because the insulating properties tend to decrease.

In the present embodiment, thus, Mn is added to the dielectric ceramic composition as a sub-ingredient such that content α of Mn is 0.003 to 0.05 parts by mol relative to 1 part by mol of the total of the constituent elements of the B site in terms of MnO.

(6) β

La is added to the dielectric ceramic composition as a sub-ingredient together with a predetermined amount of Mn, leading to improved insulating properties.

For that purpose, a content β of La relative to 1 part by mol of the total of the constituent elements of the B site needs to be at least 0.001 parts by mol in terms of $La_2O_3$.

However, a content β of La which exceeds 0.05 parts by mol relative to 1 part by mol of the total of the constituent elements of the B site in terms of $La_2O_3$ is not preferable because relative dielectric constant εr tends to decrease.

In the present embodiment, thus, La is added to the dielectric ceramic composition as a sub-ingredient such that a content β of La is 0.001 to 0.05 parts by mol relative to 1 part by mol of the total of the constituent elements of the B site in terms of $La_2O_3$.

(7) γ

Li is added to the dielectric ceramic composition as a sub-ingredient separately from the main ingredient, leading to improved sinterability in a reducing atmosphere.

In order to achieve good sinterability, a content γ of Li as a sub-ingredient needs to be at least 0.005 parts by mol relative to 1 part by mol of the total of the constituent elements of the B site in terms of $Li_2O$.

However, a content γ of Li which exceeds 0.05 parts by mol relative to 1 part by mol of the total of the constituent elements of the B site in terms of $Li_2O$ is not preferable because relative dielectric constant εr may decrease.

In the present embodiment, thus, Li is separately added to the dielectric ceramic composition as a sub-ingredient such that a content γ of Li is 0.005 to 0.05 parts by mol relative to 1 part by mol of the total of the constituent elements of the B site in terms of $Li_2O$.

In the dielectric ceramic composition, the general formula (B) has the mathematical expressions (1) to (8) as described above. Thus, a dielectric ceramic composition can be obtained that has good insulating properties even when firing is performed in a reducing atmosphere, has good dielectric characteristics with high relative dielectric constant and small dielectric loss even at no load, has reduced fluctuations in relative dielectric constant εr and dielectric loss tan δ even when dc electric field is applied, and has good DC bias characteristics.

Mn, La, and Li which are sub-ingredients may be provided in any appropriate form as long as they are contained in the dielectric ceramic composition, and may be dissolved in a solid state into the main ingredient or segregated at a grain boundary or a crystal triple point.

Although the blending ratio of the A site and the B site is 1.000 at a stoichiometric mixture ratio, they may be blended such that the A site is rich or the B site is rich.

A ceramic capacitor manufactured using the dielectric ceramic composition will now be described.

The FIGURE is a sectional view showing one embodiment of a multilayer ceramic capacitor as the ceramic capacitor according to the present invention.

The multilayer ceramic capacitor includes external electrodes 2a and 2b formed at opposite ends of a ceramic body 1. Ceramic body 1 is formed of internal electrode layers 4 formed of base metal material and ceramic layers 3, which are stacked alternately and fired, and a capacitance is formed between facing surfaces of internal electrode layer 4 electrically connected to external electrode 2a and internal electrode layer 4 electrically connected to external electrode 2b.

A method of manufacturing the multilayer ceramic capacitor will now be described in detail.

First, a Na compound containing Na, a Nb compound containing Nb, a M2 compound containing an M2 element, and an M4 compound containing an M4 element are prepared as ceramic raw materials. A K compound containing K, a Li compound containing Li, and a Ta compound containing Ta are prepared if necessary.

The form of the compound is not particularly limited. The compound may be any of oxide, carbonate, and hydroxide.

Then, the above ceramic raw materials are weighed such that the general formula (A) that represents the composition of a main ingredient satisfies the mathematical expressions (1) to (5) after firing. These weighed materials are then put into a grinder such as a ball mill or pot mill with a grinding media such as partially stabilized zirconia (PSZ) provided therein, and are sufficiently water-milled in a solvent such as ethanol, thereby obtaining a mixture.

Then, this mixture is dried, is then calcined at a predetermined temperature (e.g., 850° C. to 1000° C.) and synthesized, thereby obtaining main ingredient powder.

Then, a Mn compound containing Mn, a La compound containing La, and a Li compound containing Li are prepared as sub-ingredients, and the powder of each of these sub-ingredients is weighed such that the general formula (B) satisfies the mathematical expressions (6) to (8) described above after firing.

The form of the compound is not particularly limited similarly to the ceramic raw materials described above, and the compound may be any of oxide, carbonate, and hydroxide.

Then, the main ingredient powder is crushed, and the sub-ingredient powder, an organic binder, and a dispersant are subsequently added thereto. The resultant mixture is then wet-mixed in the ball mill together with an organic solvent such as ethanol or toluene to obtain a ceramic slurry. This ceramic slurry is then molded in accordance with the doctor blade method or any other method to produce a ceramic green sheet.

Then, screen printing is performed on the ceramic green sheet using a conductive paste for internal electrode, which contains a base metal material such as Ni, thereby forming a conductive layer having a predetermined shape.

Then, the ceramic green sheets each having the conductive layer formed thereon are stacked, and a ceramic green sheet with no conductive layer formed thereon is provided as a top layer, followed by pressurization for pressure-bonding. Consequently, a ceramic stack including conductive layers and ceramic green sheets alternately stacked is produced. Then, the ceramic stack is cut in predetermined dimensions and is housed in an aluminum sagger, followed by debinding (e.g., 250° C. to 500° C.). Then, the ceramic stack is fired at a predetermined temperature (e.g., 1000° C. to 1160° C.) in a reducing atmosphere to form ceramic body 1 including an internal electrode buried therein.

Then, a conductive paste for external electrode is applied to the opposite ends of ceramic body 1, followed by baking at a predetermined temperature (e.g., 750° C. to 850° C.) to form external electrodes. Consequently, a multilayer ceramic capacitor is produced.

Although the conductive material contained in the conductive paste for external electrode is not particularly limited, it is preferably a material containing Ag, Ni, Cu, or an alloy thereof as a main ingredient for reduced cost.

In one method of forming external electrodes $2a$ and $2b$, the conductive paste for external electrode may be applied to the opposite ends of the ceramic stack, and then fired simultaneously with the ceramic stack.

The multilayer ceramic capacitor has ceramic body 1 formed of the dielectric ceramic composition as described above. Thus, a multilayer ceramic capacitor can be obtained that has a high relative dielectric constant εr, a low dielectric loss tan δ, good dielectric characteristics, and good insulating properties even when ceramic body 1 is co-fired in a reducing atmosphere together with an internal electrode containing a base metal material such as Ni, has reduced fluctuations in dielectric characteristics when ceramic body 1 is applied with DC voltage, and has good DC bias characteristics.

The present invention is not limited to the embodiment above. For example, it suffices that the M2 element contains at least any one kind of Ca, Sr, Ba and that the M4 element contains at least any one kind of Zr, Hf, and Sn. A small amount of additive components may be added to a degree that does not affect characteristics if necessary.

Although all the ceramic raw materials required for production of a main ingredient are simultaneously weighed, mixed, calcined, and synthesized in the above embodiment, an alkali niobate-based compound and a $M2M4O_3$ compound may be produced separately, and then mixed and calcined to synthesize a main ingredient.

Although the above embodiment has described a multilayer ceramic capacitor as a ceramic capacitor by way of example, it is also applicable to a "single plate" ceramic capacitor. In this case, the use of a base metal material such as Ni or Ni—Cu as the conductive material for external electrode allows a ceramic body and external electrodes to be co-fired in a reducing atmosphere to produce a ceramic capacitor.

An example of the present invention will now be described specifically.

Example

Table 1 shows ingredient compositions of dielectric ceramic compositions produced in this example.

TABLE 1

| Sample No. | $(Na_{1-v-w-x}K_vLi_wM2_x)(Nb_{1-y-z}Ta_yM4_z)O_3 + \alpha\, MnO + \beta\, La_2O_3 + \gamma\, Li_2O$ | | | | | | | | | |
|---|---|---|---|---|---|---|---|---|---|---|
| | v | w | x | y | z | M2 | M4 | α | β | γ |
| 1* | 0 | 0 | 0 | 0 | 0 | — | — | 0.01 | 0.0025 | 0.025 |
| 2 | 0 | 0 | 0.05 | 0 | 0.05 | Ca | Zr | 0.01 | 0.0025 | 0.025 |
| 3 | 0 | 0 | 0.1 | 0 | 0.1 | Ca | Zr | 0.01 | 0.0025 | 0.025 |
| 4 | 0 | 0 | 0.15 | 0 | 0.15 | Ca | Zr | 0.01 | 0.0025 | 0.025 |
| 5* | 0 | 0 | 0.2 | 0 | 0.2 | Ca | Zr | 0.01 | 0.0025 | 0.025 |
| 6 | 0.005 | 0 | 0.1 | 0 | 0.1 | Ca | Zr | 0.01 | 0.0025 | 0.025 |
| 7 | 0.01 | 0 | 0.1 | 0 | 0.1 | Ca | Zr | 0.01 | 0.0025 | 0.025 |
| 8* | 0.02 | 0 | 0.1 | 0 | 0.1 | Ca | Zr | 0.01 | 0.0025 | 0.025 |
| 9 | 0 | 0.01 | 0.1 | 0 | 0.1 | Ca | Zr | 0.01 | 0.0025 | 0.025 |

TABLE 1-continued

| Sample No. | \{(Na$_{1-v-w-x}$K$_v$Li$_w$M2$_x$) (Nb$_{1-y-z}$Ta$_y$M4$_z$)O$_3$ + α MnO + β La$_2$O$_3$ + γ Li$_2$O | | | | | | | | | |
|---|---|---|---|---|---|---|---|---|---|---|
| | v | w | x | y | z | M2 | M4 | α | β | γ |
| 10* | 0 | 0.02 | 0.1 | 0 | 0.1 | Ca | Zr | 0.01 | 0.0025 | 0.025 |
| 11 | 0 | 0 | 0.1 | 0.1 | 0.1 | Ca | Zr | 0.01 | 0.0025 | 0.025 |
| 12* | 0 | 0 | 0.1 | 0.2 | 0.1 | Ca | Zr | 0.01 | 0.0025 | 0.025 |
| 13 | 0 | 0 | 0.1 | 0 | 0.1 | Sr | Zr | 0.01 | 0.0025 | 0.025 |
| 14 | 0 | 0 | 0.1 | 0 | 0.1 | Ba | Zr | 0.01 | 0.0025 | 0.025 |
| 15 | 0 | 0 | 0.1 | 0 | 0.1 | Ca | Hf | 0.01 | 0.0025 | 0.025 |
| 16 | 0 | 0 | 0.1 | 0 | 0.1 | Ca | Sn | 0.01 | 0.0025 | 0.025 |
| 17 | 0 | 0 | 0.1 | 0 | 0.1 | Ca/Ba = 0.5/0.5 | Zr/Hf = 0.5/0.5 | 0.01 | 0.0025 | 0.025 |
| 18 | 0 | 0 | 0.1 | 0 | 0.1 | Ca/Sr/Ba = 0.4/0.3/0.3 | Zr/Hf/Sn = 0.4/0.3/0.3 | 0.01 | 0.0025 | 0.025 |
| 19* | 0 | 0 | 0.1 | 0 | 0.1 | Ca | Zr | 0 | 0.0025 | 0.025 |
| 20 | 0 | 0 | 0.1 | 0 | 0.1 | Ca | Zr | 0.003 | 0.0025 | 0.025 |
| 21 | 0 | 0 | 0.1 | 0 | 0.1 | Ca | Zr | 0.05 | 0.0025 | 0.025 |
| 22* | 0 | 0 | 0.1 | 0 | 0.1 | Ca | Zr | 0.07 | 0.0025 | 0.025 |
| 23* | 0 | 0 | 0.1 | 0 | 0.1 | Ca | Zr | 0.01 | 0 | 0.025 |
| 24 | 0 | 0 | 0.1 | 0 | 0.1 | Ca | Zr | 0.01 | 0.001 | 0.025 |
| 25 | 0 | 0 | 0.1 | 0 | 0.1 | Ca | Zr | 0.01 | 0.05 | 0.025 |
| 26* | 0 | 0 | 0.1 | 0 | 0.1 | Ca | Zr | 0.01 | 0.07 | 0.025 |
| 27* | 0 | 0 | 0.1 | 0 | 0.1 | Ca | Zr | 0.01 | 0.05 | 0 |
| 28 | 0 | 0 | 0.1 | 0 | 0.1 | Ca | Zr | 0.01 | 0.0025 | 0.005 |
| 29 | 0 | 0 | 0.1 | 0 | 0.1 | Ca | Zr | 0.01 | 0.0025 | 0.05 |
| 30* | 0 | 0 | 0.1 | 0 | 0.1 | Ca | Zr | 0.01 | 0.0025 | 0.1 |

The mark * is outside the scope of the present invention.

First, Na$_2$CO$_3$, K$_2$CO$_3$, Li$_2$CO$_3$, Nb$_2$O$_5$, Ta$_2$O$_5$, CaCO$_3$, SrCO$_3$, BaCO$_3$, ZrO$_2$, SnO$_2$, and HfO$_2$ were prepared as ceramic raw materials.

Subsequently, after firing, the ceramic raw materials were each weighed such that v, w, x, y, z, M2 element, and M4 element in a general formula \{(Na$_{1-v-w-x}$K$_v$Li$_w$M2$_x$) (Nb$_{1-y-z}$Ta$_y$M4$_z$)O$_3$\} satisfy Table 1.

Subsequently, the weighed materials were put into a ball mill with an PSZ ball provided therein and were wet-mixed for 24 hours using ethanol as a solvent. Then, the obtained mixture was dried and calcined at a temperature of 1000° C. to obtain main ingredient powder.

The main ingredient powder was subjected to structure analysis by the X-ray powder diffraction method. It was then confirmed that the main ingredient powder exhibits a perovskite crystalline phase.

Subsequently, MnCO$_3$, La$_2$O$_3$, and Li$_2$CO$_3$ were prepared as sub-ingredient powder. Then, MnCO$_3$, La$_2$O$_3$, and Li$_2$CO$_3$ were each weighed such that a content α of MnO, a content β of La$_2$O$_3$, and a content γ of Li$_2$O relative to 1 part by mol of a main ingredient after firing are as shown in Table 1.

Subsequently, the main ingredient powder was crushed, and the main ingredient powder, the sub-ingredient powder, an organic binder, a dispersant, and a solvent mixture of ethanol and toluene were put into the ball mill with a PSZ ball provided therein again, were wet-mixed sufficiently, and were then molded by doctor blading to obtain a ceramic green sheet having a thickness of 10 μm.

Subsequently, a conductive paste for internal electrode containing Ni was prepared as a conductive material. This conductive paste for internal electrode was used to form a conductive layer having a predetermined pattern on the ceramic green sheet by screen printing. Then, a predetermined number of the ceramic green sheets with the conductive layer formed thereon were stacked, and a ceramic green sheet having no conductive layer on its front and rear surfaces was provided as a top layer. Then, the stacked ceramic green sheets were press-bonded by pressurization at a pressure of approximately 2.45×10$^7$ Pa to produce a ceramic stack.

Subsequently, this ceramic stack was fired at a temperature of approximately 1100° C. for two hours in a reducing atmosphere adjusted to be reductive side by a digit of 0.5 of Ni/NiO equilibrium oxygen partial pressure, thereby producing a ceramic body with an internal electrode buried therein.

Subsequently, a conductive paste for external electrode containing Ag as a main ingredient was prepared. Then, the conductive paste for external electrode was applied to the opposite ends of the ceramic body and baked at 900° C. to obtain samples of sample Nos. 1 to 30.

The dimensions of each of the obtained samples were a length of 2.0 mm, a width of 1.25 mm, and a thickness of 1.25 mm. The thickness of one ceramic layer was 0.08 mm, the thickness of the internal electrode was 0.002 mm, the number of ceramic layers was ten, and an electrode area between facing surfaces which contributes to acquisition of capacitance was 1.7 mm$^2$.

The composition of the ceramic body excluding the internal electrode was analyzed by inductively coupled plasma mass spectrometry (IPC-MS), and it was confirmed that the respective samples have the compositions shown in Table 1.

Evaluations of Samples

Twenty samples were prepared for each of sample Nos. 1 to 30. Subsequently, the capacitance and dielectric loss (tan δ) of each sample were measured with an automatic bridge-type meter on the conditions of a measuring frequency of 1 kHz, an effective voltage of 1 Vrms, and a measurement temperature of 25° C., and each relative dielectric constant was calculated from the measurement result and the dimensions of the sample. An average of the relative dielectric constants and an average of the dielectric losses were respectively obtained as relative dielectric constant εr and dielectric loss tan δ.

Ten samples were prepared for each of sample Nos. 1 to 30. Subsequently, using an ammeter, a voltage of 800 V was applied at a temperature of 25° C., and the insulation resistance of each sample was measured. Then, a specific resistance was calculated from the measurement result and the dimensions of the sample, and a logarithm equivalent of an average of the specific resistances was obtained as specific resistance log ρ (Ω·m).

Ten samples were prepared for each of sample Nos. 1 to 30. Subsequently, the capacitance and dielectric loss (tan δ) of each sample were measured with an automatic bridge-type meter on the conditions of a measuring frequency of 1 kHz, an effective voltage of 1 Vrms, and a measurement temperature of 25° C. while applying a dc electric field of 10 kV/mm to each sample, and each relative dielectric constant was calculated from the measurement result and the dimensions of the sample. An average of the relative dielectric constants and an average of the dielectric losses were respectively obtained as relative dielectric constant εr and dielectric loss tan δ.

Table 2 shows the measurement results of sample Nos. 1 to 30. A sample exhibiting a specific resistance log ρ of 10.0 or more, a relative dielectric constant εr of 1000 or more and a dielectric loss tan δ of 6% or less at no load, and a relative dielectric constant εr of 800 or more and a dielectric loss tan δ of 6% or less during application of DC bias was determined as a non-defective product.

TABLE 2

| Sample No. | At no load | | | During DC bias (10 kV/mm) | |
|---|---|---|---|---|---|
| | Relative dielectric constant εr | Dielectric loss tan δ (%) | Specific resistance log ρ (ρ:Ω:m) | Relative dielectric constant εr | Dielectric loss tan δ (%) |
| 1* | 340 | 10.7 | 7.2 | 220 | 23.6 |
| 2 | 1050 | 1.5 | 10.5 | 850 | 1.0 |
| 3 | 1300 | 1.6 | 11.3 | 900 | 0.8 |
| 4 | 1080 | 1.6 | 10.6 | 850 | 0.8 |
| 5* | 480 | 1.1 | 9.8 | 440 | 1.1 |
| 6 | 1320 | 1.8 | 11.0 | 910 | 1.0 |
| 7 | 1350 | 3.0 | 10.3 | 920 | 2.0 |
| 8* | 1400 | 2.8 | 9.6 | 910 | 2.2 |
| 9 | 1100 | 1.8 | 10.6 | 880 | 1.0 |
| 10* | 980 | 1.5 | 10.5 | 780 | 0.9 |
| 11 | 1030 | 1.2 | 11.0 | 840 | 0.7 |
| 12* | 850 | 0.8 | 11.2 | 790 | 0.6 |
| 13 | 1260 | 1.8 | 10.8 | 900 | 0.9 |
| 14 | 1350 | 2.0 | 10.6 | 910 | 0.9 |
| 15 | 1320 | 1.6 | 10.6 | 900 | 0.9 |
| 16 | 1260 | 1.8 | 10.5 | 890 | 1.0 |
| 17 | 1320 | 2.0 | 10.6 | 910 | 1.0 |
| 18 | 1280 | 1.6 | 10.5 | 900 | 0.7 |
| 19* | 2220 | 21.5 | 6.7 | 740 | 15.0 |
| 20 | 1580 | 5.7 | 10.0 | 830 | 6.0 |
| 21 | 1250 | 1.6 | 10.1 | 860 | 0.8 |
| 22* | 1230 | 1.5 | 9.6 | 860 | 0.8 |
| 23* | 1460 | 1.3 | 9.0 | 870 | 1.4 |
| 24 | 1250 | 0.8 | 10.1 | 920 | 0.6 |
| 25 | 1100 | 1.6 | 10.5 | 860 | 0.8 |
| 26* | 960 | 1.0 | 10.5 | 820 | 0.7 |
| 27* | not sintered | not sintered | not sintered | not sintered | not sintered |
| 28 | 1340 | 2.3 | 10.3 | 900 | 1.0 |
| 29 | 1100 | 1.6 | 10.5 | 880 | 0.8 |
| 30* | 900 | 1.4 | 10.3 | 820 | 0.7 |

The mark * is outside the scope of the present invention.

Sample No. 1 is a sample in which a main ingredient is formed of $NaNbO_3$ alone and the main ingredient does not contain an M2 element or an M4 element. It was accordingly found that sample No. 1 has an excessively low relative dielectric constant εr of 340 and a dielectric loss tan δ of 10.7% exceeding 10% even at no load, has a specific resistance log ρ of as low as 7.2, and accordingly has poor dielectric characteristics and poor insulating properties.

Sample No. 5 is a sample in which a content x of the M2 element and a content z of the M4 element in the main ingredient are as high as 0.2 exceeding 0.1. It was accordingly found that though sample No. 5 has a low dielectric loss tan δ, it has a relative dielectric constant εr of as low as 480 and a specific resistance log ρ decreased to 9.8, which is less than 10, even at no load.

Sample No. 19 is a sample in which a sub-ingredient does not contain MnO. It was accordingly found that sample No. 19 has a specific resistance log ρ of as low as 6.7 and a dielectric loss tan δ of as high as 21.5%, has a greatly reduced relative dielectric constant εr by application of dc electric field, and has poor DC bias characteristics.

Sample No. 22 is a sample in which a content α of MnO as a sub-ingredient is 0.07 parts by mol relative to 1 part by mol of main ingredient, which exceeds 0.05 parts by mol, and accordingly has a specific resistance log ρ decreased to 9.6. It was found that sample No. 22 has poor insulating properties.

Sample No. 23 is a sample in which a sub-ingredient does not contain $La_2O_3$. It was accordingly found that sample No. 23 has a specific resistance log ρ decreased to 9.0 and has poor insulating properties.

Sample No. 26 is a sample in which a content β of $La_2O_3$ as a sub-ingredient is 0.07 parts by mol relative to 1 part by mol of main ingredient, which exceeds 0.05 parts by mol. It was accordingly found that sample No. 26 has a relative dielectric constant εr decreased to 960 at no load, which is less than 1000.

Since sample No. 27 is a sample in which the sub-ingredient does not contain $Li_2O$, it has poor sinterability. It was accordingly found that sample No. 27 was not sintered successfully at the firing temperature of the present example.

Sample No. 30 is a sample in which a content γ of $Li_2O$ as a sub-ingredient is 0.1 parts by mol relative to 1 part by mol of the main ingredient, which exceeds 0.05 parts by mol. It was accordingly found that relative dielectric constant εr at no load decreases to 900 in sample No. 30, which is less than 1000.

Sample No. 8 is a sample in which a content v of K of the A site is 0.02, which exceeds 0.01, and accordingly has a specific resistance log ρ decreased to 9.6, which is less than 10.

Sample No. 10 is a sample in which a content w of Li of the A site is 0.02, which exceeds 0.01, and accordingly has a relative dielectric constant εr decreased to 980 at no load, which is less than 1000.

Sample No. 12 is a sample in which a blending amount z of Ta of the B site is 0.2, which exceeds 0.1, and accordingly has a relative dielectric constant εr decreased to 850 at no load, which is less than 1000.

In contrast, sample Nos. 2 to 4, 6, 7, 9, 11, 13 to 18, 20, 21, 24, 25, 28, and 29 are samples in which the ingredient composition is within the scope of the present invention. It was accordingly found that a dielectric ceramic composition can be obtained that has a relative dielectric constant εr of 1000 or more and a dielectric loss tan δ of 6% or less at no load, exhibiting good dielectric characteristics, has a specific resistance log ρ of 10 or more, exhibiting good insulating properties, maintains a relative dielectric constant εr of 800 or more and a dielectric loss tan δ of 6% or less even when dc electric field is applied, successfully reducing variations in relative dielectric constant εr and dielectric loss tan δ, and has good DC device characteristics.

Although desired dielectric characteristics, insulating properties, and DC device characteristics can be obtained by partially replacing Na by K or Li or partially replacing Nb by Ta as apparent from the comparison between sample Nos. 7 and 8, between sample Nos. 9 and 10, between sample Nos. 11 and 12, it was confirmed that even in such a case, contents v and w of K and Li of the A site need to be 0.01 or less and a content y of Ta of the B site needs to be 0.1 or less.

Further, as apparent from sample Nos. 13 to 18, the following was confirmed: the M2 element may be one kind selected from the group consisting of Ca, Ba, and Sr or a combination of two or more kinds thereof, and the M4 element may be one kind selected from the group consisting of Zr, Hf, and Sn or a combination of two or more kinds thereof.

A dielectric ceramic composition is achieved that has good insulating properties, and has good dielectric characteristics at no load, as well as desired good dielectric characteristics also during DC biasing in which dc electric field is applied. Also, various types of ceramic capacitors such as a multilayer ceramic capacitor including the dielectric ceramic composition are achieved.

REFERENCE SIGNS LIST 1 ceramic body
2a, 2b external electrode
3 ceramic layer
4 internal electrode

The invention claimed is:

1. A dielectric ceramic composition comprising:
a main ingredient formed of a perovskite compound represented by a general formula $ABO_3$, wherein
the A site contains at least an alkali metal element containing Na and an M2 element, where M2 is at least one kind of element selected from Ba, Ca, and Sr, and
the B site contains at least Nb and an M4 element, where M4 is at least one kind of element selected from Zr, Hf, and Sn,
a molar ratio content of the M2 element is 0.05 to 0.15 relative to a total of constituent elements of the A site, and a molar ratio content of the M4 element is 0.05 to 0.15 relative to a total of constituent elements of the B site;
Mn at 0.003 to 0.05 parts by mol relative to 1 part by mol of the total of the constituent elements of the B site in terms of MnO;
La at 0.001 to 0.05 parts by mol relative to 1 part by mol of the total of the constituent elements of the B site in terms of $La_2O_3$; and
Li at 0.005 to 0.05 parts by mol relative to 1 part by mol to the total of the constituent elements of the B site in terms of $Li_2O$;
at least one of K and Li added to the A site in a molar ratio range of 0 to 0.01 relative to the total of the constituent elements of the A site; and
Ta added to the B site in a molar ratio range of 0 to 0.1 relative to the total of the constituent elements of the B site.

2. The dielectric ceramic composition according to claim 1, further comprising at least one of K and Li added to the A site in a molar ratio range of up to 0.01 relative to the total of the constituent elements of the A site.

3. The dielectric ceramic composition according to claim 2, further comprising Ta added to the B site in a molar ratio range of up to 0.1 relative to the total of the constituent elements of the B site.

4. The dielectric ceramic composition according to claim 1, further comprising Ta added to the B site in a molar ratio range of up to 0.1 relative to the total of the constituent elements of the B site.

5. A ceramic capacitor comprising:
a ceramic body; and
an external electrode on a surface of the ceramic body,
wherein the ceramic body is formed of a dielectric ceramic composition according to claim 1.

6. The ceramic capacitor according to claim 5, further comprising an internal electrode buried in the ceramic body, the internal electrode containing a base metal material.

7. The ceramic capacitor according to claim 6, wherein the base metal material contains Ni.

8. A ceramic capacitor comprising:
a ceramic body; and
an external electrode on a surface of the ceramic body,
wherein the ceramic body is formed of a dielectric ceramic composition according to claim 2.

9. The ceramic capacitor according to claim 8, further comprising an internal electrode buried in the ceramic body, the internal electrode containing a base metal material.

10. The ceramic capacitor according to claim 9, wherein the base metal material contains Ni.

11. A ceramic capacitor comprising:
a ceramic body; and
an external electrode on a surface of the ceramic body,
wherein the ceramic body is formed of a dielectric ceramic composition according to claim 3.

12. The ceramic capacitor according to claim 11, further comprising an internal electrode buried in the ceramic body, the internal electrode containing a base metal material.

13. The ceramic capacitor according to claim 12, wherein the base metal material contains Ni.

14. A ceramic capacitor comprising:
a ceramic body; and
an external electrode on a surface of the ceramic body,
wherein the ceramic body is formed of a dielectric ceramic composition according to claim 4.

15. The ceramic capacitor according to claim 14, further comprising an internal electrode buried in the ceramic body, the internal electrode containing a base metal material.

16. The ceramic capacitor according to claim 15, wherein the base metal material contains Ni.

* * * * *